May 6, 1930.  G. L. DOUGLASS ET AL  1,757,453
CARGO UNLOADING APPARATUS
Filed Feb. 23, 1924    2 Sheets-Sheet 1
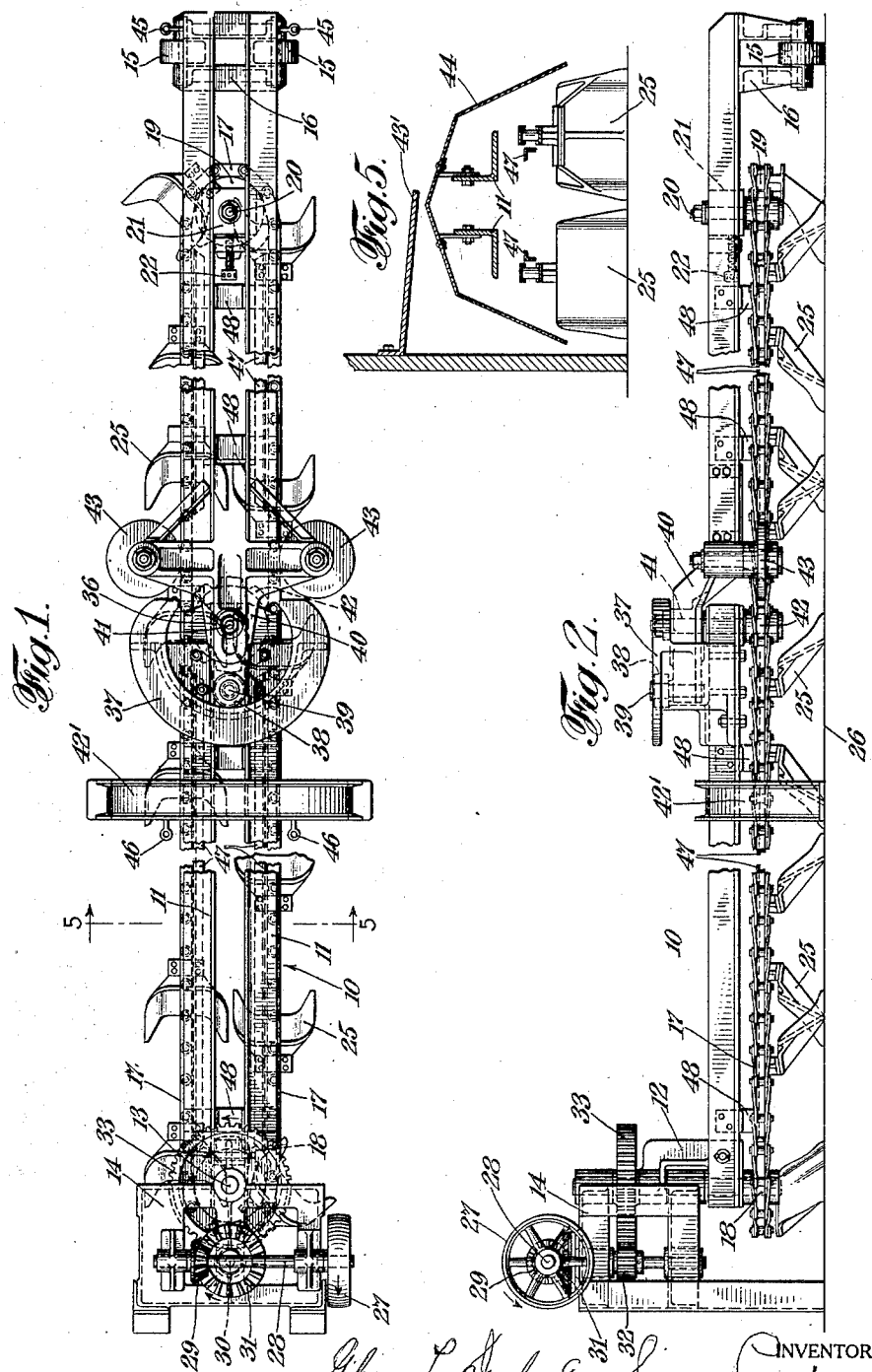

May 6, 1930.   G. L. DOUGLASS ET AL   1,757,453
CARGO UNLOADING APPARATUS
Filed Feb. 23, 1924   2 Sheets-Sheet 2
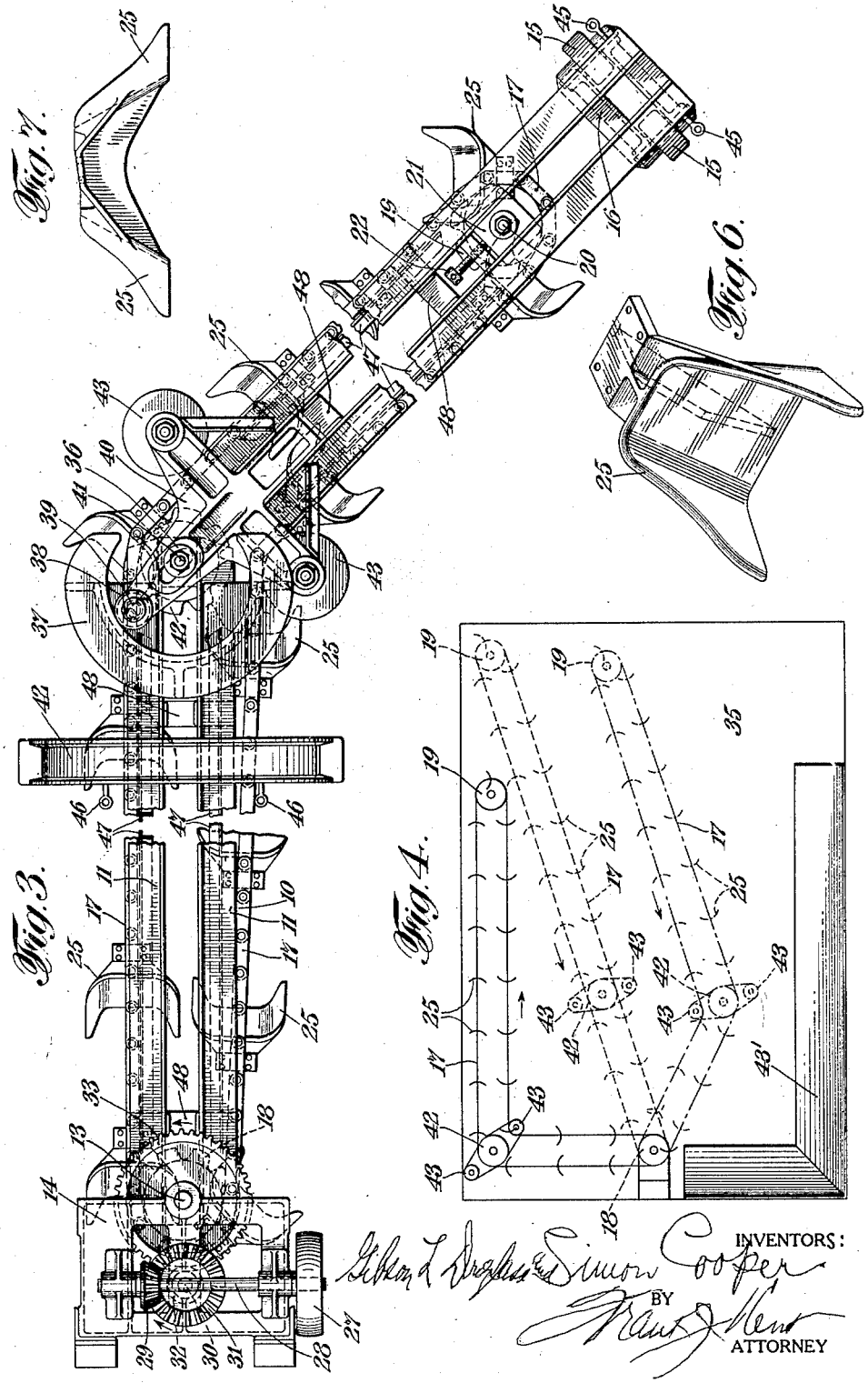
INVENTORS:
ATTORNEY Patented May 6, 1930

1,757,453

UNITED STATES PATENT OFFICE

GIBSON L. DOUGLASS, OF NEW YORK, AND SIMON COOPER, OF BROOKLYN, NEW YORK

CARGO-UNLOADING APPARATUS

Application filed February 23, 1924. Serial No. 694,477.

This invention relates generally to cargo unloading apparatus and more particularly to the type of apparatus used in delivering loose material from various parts of a compartment to an elevator or other material discharging device stationed at a fixed point.

The invention consists in the provision of an unloading device of the type described which is arranged to be left in position in a compartment during the filling of the compartment with cargo and to remain in position beneath the mass of cargo in readiness to be set into operation when the time comes for the removal of the cargo from the compartment.

Another feature of the invention resides in a capability of movement of the device from place to place in the compartment in order to bring it into cooperative relation to other portions of the cargo mass as the cargo immediately adjacent to and above the position of the device is cleared.

In a preferred form of the invention the cargo unloading device takes the form of a horizontally disposed endless conveyor having flights of a scoop-like or shovel formation and arranged to rest on and travel along the floor of the cargo compartment so as to push the engaged material ahead of them to the place of discharge or delivery.

Preferably the conveyor framework has a jointed or articulated formation to provide for the bodily movement thereof whereby it may be brought into operative relation to different parts of the compartment. In order to facilitate the initiating of the unloading operation, a cover or shield is preferably provided for preventing the complete submergence of the apparatus in the material making up the cargo.

Other features of the invention will be hereinafter referred to.

In the drawings, in which a preferred form of the invention has been selected for illustration, Figure 1 is a plan view of a cargo unloader embodying the invention.

Figure 2 is a view in side elevation of the device shown in Figure 1.

Figure 3 is a plan view of the device shown in Figure 1 on a somewhat enlarged scale and showing the conveyor sections disposed at an angle to each other.

Figure 4 is a plan view largely diagrammatic showing various dispositions of the unloader that may be made.

Figure 5 is a sectional view of unloader apparatus embodying the invention.

Figure 6 is a view in perspective of a form of scoop member used in the apparatus.

Figure 7 is a view of a modified form of scoop member that may be used in connection with the device.

Referring to the drawings for a more detailed description of the invention, an elongated frame member 10 is made up of two spaced apart angle bars 11, the framework being supported at one end on a yoke 12 pivotally mounted on a shaft 13 journalled in a framework 14 in which suitable driving mechanism is located. The conveyor framework 10 is supported at its other end on a pair of rollers 15 on which the outer end of the device may be moved from side to side as desired. The truck frame 16 in which the rollers 15 are carried may have a swiveled relation with the framework 10.

I contemplate also the placing of the roller support at a point spaced from the end of the conveyor framework in order to provide for the travel of the conveyor plow or shovel members to the extreme end of the supporting framework in the manner diagrammatically indicated in Figure 4 of the drawing.

The shaft 13 on which the framework 10 is pivoted at one end serves also as a drive shaft for a conveyor chain 17 which is carried by a sprocket 18 at the lower end of the shaft 13 and turns about a sprocket 19 adjacent the outer end of the framework. The sprocket 19 is journaled on a vertical stub shaft 20 mounted in a slide block 21 spanning the space between the angle bars 11 and adjustable longitudinally of the bars for taking up slack in the chain 17 through the adjusting screw 22.

The flights of the conveyor take the form of scoop or shovel members 25 which depend from the chain and rest on the floor surface 26. In operation the scoop members 25 are moved along the floor surface by the movement of the chain and operate to push material before them to a delivery point adjacent the framework 14.

Driving mechanism for the conveyor includes a driving pulley 27 mounted on a counter shaft 28 which carries a bevel pinion 29. A second shaft 30 having a parallel relation to the shaft 13 supports a bevel gear 31 which meshes with the bevel pinion 29 and receives motion therefrom. A spur gear 32 on the shaft 30 meshes with a gear 33 on the shaft 13 and serves to drive the shaft 13 and the sprocket 18 by which the conveyor chain 17 is driven.

In order to utilize the unloading device to clear the entire contents of a cargo compartment 35, the framework 14 to which the conveyor is pivotally connected is preferably located adjacent a centrally disposed portion of an end wall of the compartment so that the free end of the unloader can be swung from one side to the other of the opposite end wall as indicated diagrammatically in Figure 4 of the drawing. To further facilitate the location of the unloader in any part of the cargo department, the conveyor framework 10 is jointed or hinged at a point intermediate its ends as at 36. By this structural arrangement the jointed portion of the framework may be moved into either corner of the compartment flanking the pivoted end of the conveyor, the angular disposition of the conveyor being thereby made to correspond to the angular relation of the adjacent compartment walls.

The joint 36 in the conveyor framework is formed by a break in the framework in connection with which a curved cam track member 37 on the end of one section of the framework is engaged by a roller 38 carried by a stud 39 mounted on a frame member 40 on the other conveyor framework section. The frame member 40 is pivoted on a stud 41 which is mounted in the adjacent end of the section bearing the cam track section. On the lower end of the stud 41 a sprocket 42 is mounted for engagement by the opposite stretches of the conveyor chain 17. A pair of idle pulleys 43 carried by the frame member 40 engage the chain stretches on the outer faces thereof and act to hold the chain to its course particularly when passing through the inner angle of the bend. This feature of the invention is particularly illustrated in Figure 3 of the drawing.

By the use of a slot 45' in the frame member 40 through which the stud 41 passes the conformation of the cam track 37 produces longitudinal movement of the conveyor section carrying the frame member 40 by an amount to exactly compensate for the variations in the length of the chain due to the changes effected in the angular disposition of the conveyor as a whole.

The joint portion of the conveyor framework is supported in part by an inverted U-shaped supporting member 42' which rests directly on the floor as is shown in Figure 1 of the drawing.

In order to prevent the complete engulfing and burying of the unloader in the mass of cargo a canopy or shield 43' is provided which follows a portion of the end wall of the compartment adjacent the pivoted end of the conveyor and the adjacent side wall of the compartment. In addition a roof-like member 44 is mounted on and carried by each section of the conveyor structure. The provision of the canopies 43 and 44 insures that only the edge portion of the cargo mass will find its way beneath the canopies and into the path of the conveyor plows attached to one of the conveyor chain stretches. This condition is maintained until the material filling the cargo space above the canopies has been cleared away by the operation of the unloader. When this has been accomplished the conveyor is moved into renewed engagement with the foot of the sloping mass of material, this repositioning of the conveyor parts being brought about by the use of cables attached to ring bolts 45 and 46 at the free end and the mid-portion of the conveyor structure and passing around suitably disposed sheaves to an operator's station.

The operation of the plows or flights is facilitated by a guide bar 47 supported on brackets 48 and bearing against the inner face of the conveyor chain. The material arriving at the pivoted end of the conveyor framework is caused to drop through a conveniently arranged aperture for delivery to an elevator or conveyor belt or other discharging means.

What is claimed is:—

1. In conveyor apparatus, a horizontally extending horizontally articulated conveyor support, means for maintaining the conveyor support in parallel and spaced apart relation to a floor surface, a flexible conveyor member mounted on the support, and scoop members carried by the flexible conveyor member and arranged to travel along said floor surface throughout the extent of travel of said scoop members.

2. In conveyor apparatus, a horizontally extending horizontally articulated conveyor support, means for maintaining the conveyor support in parallel and spaced apart relation to a floor surface, a flexible conveyor member mounted on the support, scoop members carried by the flexible member and arranged to rest on and travel along the floor surface throughout the extent of travel of said scoop members, and said elongated support having pivotal movement about one end.

3. In conveyor apparatus, a horizontally extending horizontally articulated conveyor support, means for maintaining the conveyor support in parallel and spaced apart relation to a floor surface, a flexible conveyor member mounted on the support, scoop members carried by the flexible member and arranged to rest on and travel along the floor surface throughout the extent of travel of said scoop members, and said elongated conveyor support being mounted to swing about one end as a center and having a hinged joint intermediate its ends.

4. In conveyor apparatus, a horizontally extending elongated conveyor support, means for holding the support at a spaced apart relation to a floor surface, a flexible conveyor member mounted on the support, scoop members carried by the flexible member and arranged to rest on and travel along the floor surface, said elongated conveyor support being mounted to swing about one end as a center and having an articulated construction whereby it may be moved to clear all portions of the floor area of a rectangular compartment, and means for maintaining the flexible conveyor member under tension in all positions of the conveyor support.

5. In conveyor apparatus, a horizontally extending elongated conveyor support, means for maintaining the conveyor support in parallel and spaced apart relation to a floor surface, a flexible conveyor member mounted on the support, and scoop members carried by the flexible member and arranged to travel along the floor surface throughout the extent of travel of said scoop members, said scoop members having a plow-shaped formation to raise and loosen engaged material.

6. In cargo unloading apparatus, a cargo compartment, a horizontally articulated conveyor arranged to move material along the floor of the compartment, said conveyor being pivotally mounted at one end adjacent a wall of the compartment, and a shield mounted along the wall of the compartment and adapted to protect the conveyor during the loading of the compartment.

7. In conveyor apparatus, an endless flexible conveyor member arranged to move material along a level surface, an elongated supporting member for the conveyor member made up of sections articulated to move laterally over said surface, said conveyor supporting member being mounted for lateral pivotal movement about one end.

8. In cargo unloading apparatus, a cargo compartment and a horizontally articulated conveyor arranged to move material along the floor of the compartment, said conveyor comprising a pair of sections, one end of one section being pivoted on a vertical pivot to an end of the second section, the free end of the first section being pivoted adjacent one wall of the compartment, the combined length of the sections being sufficient to reach from the pivotal point to the most remote part of the compartment and the first section being short enough to extend along the wall adjacent the pivot point of the conveyor.

In testimony whereof we affix our signatures.

GIBSON L. DOUGLASS.
SIMON COOPER.